(12) United States Patent
Sharma et al.

(10) Patent No.: US 8,641,804 B2
(45) Date of Patent: Feb. 4, 2014

(54) SYSTEMS AND METHODS TO CONDITION AIR

(75) Inventors: Ratnesh Kumar Sharma, Fremont, CA (US); Chih C. Shih, San Jose, CA (US); Thomas W. Christian, Fort Collins, CO (US); Cullen E. Bash, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 247 days.

(21) Appl. No.: 13/194,123

(22) Filed: Jul. 29, 2011

(65) Prior Publication Data

US 2013/0025450 A1 Jan. 31, 2013

(51) Int. Cl.
*B01D 53/06* (2006.01)
*B01D 53/26* (2006.01)

(52) U.S. Cl.
USPC ............. 95/113; 95/123; 96/125; 96/144; 96/146

(58) Field of Classification Search
USPC .............. 95/125, 126, 144, 146; 96/113, 117, 96/148, 123, 126; 62/94, 271
See application file for complete search history.

(56) References Cited

U.S. PATENT DOCUMENTS

| | | | | |
|---|---|---|---|---|
| 3,889,742 | A * | 6/1975 | Rush et al. | 96/144 |
| 4,180,985 | A * | 1/1980 | Northrup, Jr. | 62/94 |
| 4,887,438 | A * | 12/1989 | Meckler | 62/271 |
| 4,948,392 | A * | 8/1990 | Rush | 95/113 |
| 5,251,458 | A * | 10/1993 | Tchernev | 62/271 |
| 6,450,244 | B1 | 9/2002 | Bassilakis | |
| 6,751,964 | B2 * | 6/2004 | Fischer | 62/94 |
| 6,935,131 | B1 * | 8/2005 | Backman | 62/271 |
| 2009/0168345 | A1 | 7/2009 | Martini | |
| 2010/0024445 | A1 | 2/2010 | Cichanowicz | |
| 2010/0031820 | A1 | 2/2010 | Minkkinen | |
| 2010/0242507 | A1 * | 9/2010 | Meckler | 62/94 |
| 2010/0281893 | A1 * | 11/2010 | Wheeler | 62/94 |

FOREIGN PATENT DOCUMENTS

| | | |
|---|---|---|
| JP | 10205816 | 8/1998 |
| JP | 2008111644 | 5/2008 |

OTHER PUBLICATIONS

Bacha et al., "Air Conditioning by Solar Energy," Journal of Electron Devices, vol. 2, 2003, (6 pages).
Mei et al., "An Assessment of Desiccant Cooling and Dehumidification Technology," Oak Ridge National Laboratory, Oak Ridge, Tennessee, Jul. 1992, (133 pages).
Adams, Larry, "Cooling Technologies: Designed to Dry," http://www.appliancedesign.com/Articles/Article_Rotation/BNP_GUID_9-5-2006_A_10000000000000558309, published Mar. 31, 2009, accessed Oct. 4, 2010, (3 pages).
Energy and Environmental Analysis, Inc., "Distributed Energy Program Report: Distributed Energy Technology Characterization," U.S. Department of Energy: Energy Efficiency and Renewable Energy, Jan. 2003, (51 pages).

* cited by examiner

*Primary Examiner* — Frank Lawrence, Jr.

(57) ABSTRACT

Systems and methods to condition air are disclosed. An example system includes a desiccant heat transfer device to supply conditioned air to a facility, an air intake to receive air to be conditioned via the desiccant heat transfer device, and a make-up exhaust to provide exhaust air from a heat dissipating device in the facility to provide heated air to reactivate the desiccant heat transfer device.

19 Claims, 6 Drawing Sheets

SYSTEMS AND METHODS TO CONDITION AIR

BACKGROUND

Data centers and other facilities are provided with air conditioning systems to manage ambient temperatures and prevent overheating of electronic equipment. Such air conditioning systems are often costly and expensive to operate.

DETAILED DESCRIPTION

Commercial or industrial facilities, such as manufacturing facilities, data centers, and/or other types of facilities, often include large numbers of heat dissipating devices, each of which generates heat during operation. As used herein, heat dissipating devices may include computer or other electronic systems, machinery, or any other type of heat dissipating device. To reduce the risk of overheating, the heat dissipating devices are kept in air conditioned spaces and provided with fans to circulate air around the heat dissipating devices. Some known air conditioning systems cool outside air and provide the cooled air to the air conditioned space. These cooling systems can use significant amounts of resources such as electrical power. Facilities located in warmer, more humid climates particularly employ substantial amounts of electrical power to cool the air, which substantially increases the costs of operating such facilities.

Example systems and methods disclosed herein use waste heat from heat dissipating devices to reduce the energy load used to condition air for a facility in which the heat dissipating devices are located. A disclosed example system uses a desiccant heat transfer device, such as a desiccant wheel, to dry incoming air to be conditioned for a facility. Dry air uses fewer resources to cool to appropriate temperatures than air having higher moisture content. The desiccant wheel is then recharged by a combination of exhaust air from a heat source and make-up air from heat dissipating devices within the facility. Disclosed example facilities include data centers having heat dissipating devices such as computer systems. By providing exhaust air from a heat dissipating device in a facility to provide heated air for reactivating a desiccant heat transfer device, example systems and methods disclosed herein substantially reduce the high costs of operating facilities experienced by known systems. These operating costs are significantly reduced in relatively hot, humid climates.

Figure 1A:
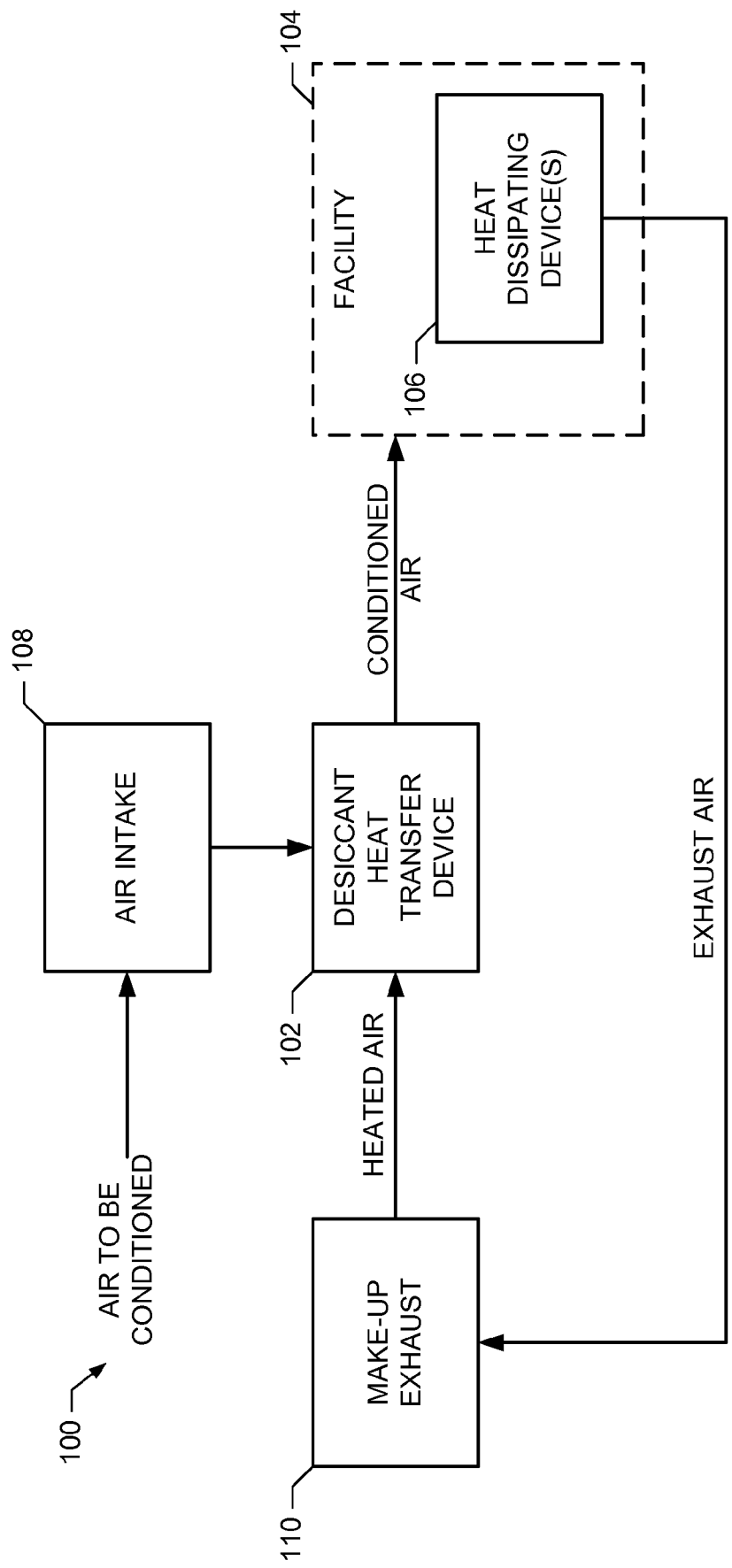
FIG. 1A is a block diagram of an example system constructed in accordance with the teachings of this disclosure to condition air.

FIG. 1A is a block diagram of an example system 100 to condition air. The example system includes a desiccant heat transfer device 102. The example desiccant heat transfer device 102 provides conditioned air to a facility 104. The facility 104 in the illustrated example of FIG. 1A includes heat dissipating device(s) 106. As used herein, the heat dissipating device(s) 106 may include any number and/or type(s) of heat dissipating device(s) 106 having a common cooling air intake and/or a common exhaust air output. Example heat dissipating device(s) 106 include machinery, power generation equipment, electrical systems such as computers, and/or other types of heat generating devices.

The example system 100 of FIG. 1A further includes an air intake 108. The example air intake 108 receives air to be conditioned via the desiccant heat transfer device 102 and to supply conditioned air to the facility 104. Desiccants have limits on the amount of fluid (e.g., water vapor in the air from the air intake 108) that can be adsorbed before saturating. Once saturated, the desiccant is not able to adsorb additional fluid unless it is recharged (e.g., dried out of the saturation state). Desiccants can be recharged by applying heat, which causes the desiccant to release or desorb captured fluid back into the air. To this end, the example system 100 of FIG. 1A also includes a make-up exhaust 110 to provide exhaust air from the heat dissipating device(s) 106 in the facility 104 to provide heated air to reactivate the desiccant heat transfer device 102.

In operation, the example air intake 108 receives the air to be conditioned and provides the air to the desiccant heat transfer device 102. The desiccant heat transfer device 102 at least partially conditions the air to generate conditioned air, which is provided to the example facility 104. In some examples, the conditioned air cools and/or dries the heat dissipating device(s) 106 to reduce or even prevent overheating and/or condensation. The heat dissipating device(s) 106 provide exhaust air to the make-up exhaust 110. The example make-up exhaust 110 provides heated air to the desiccant heat transfer device 102 to recharge the desiccant heat transfer device 102.

Figure 1B:
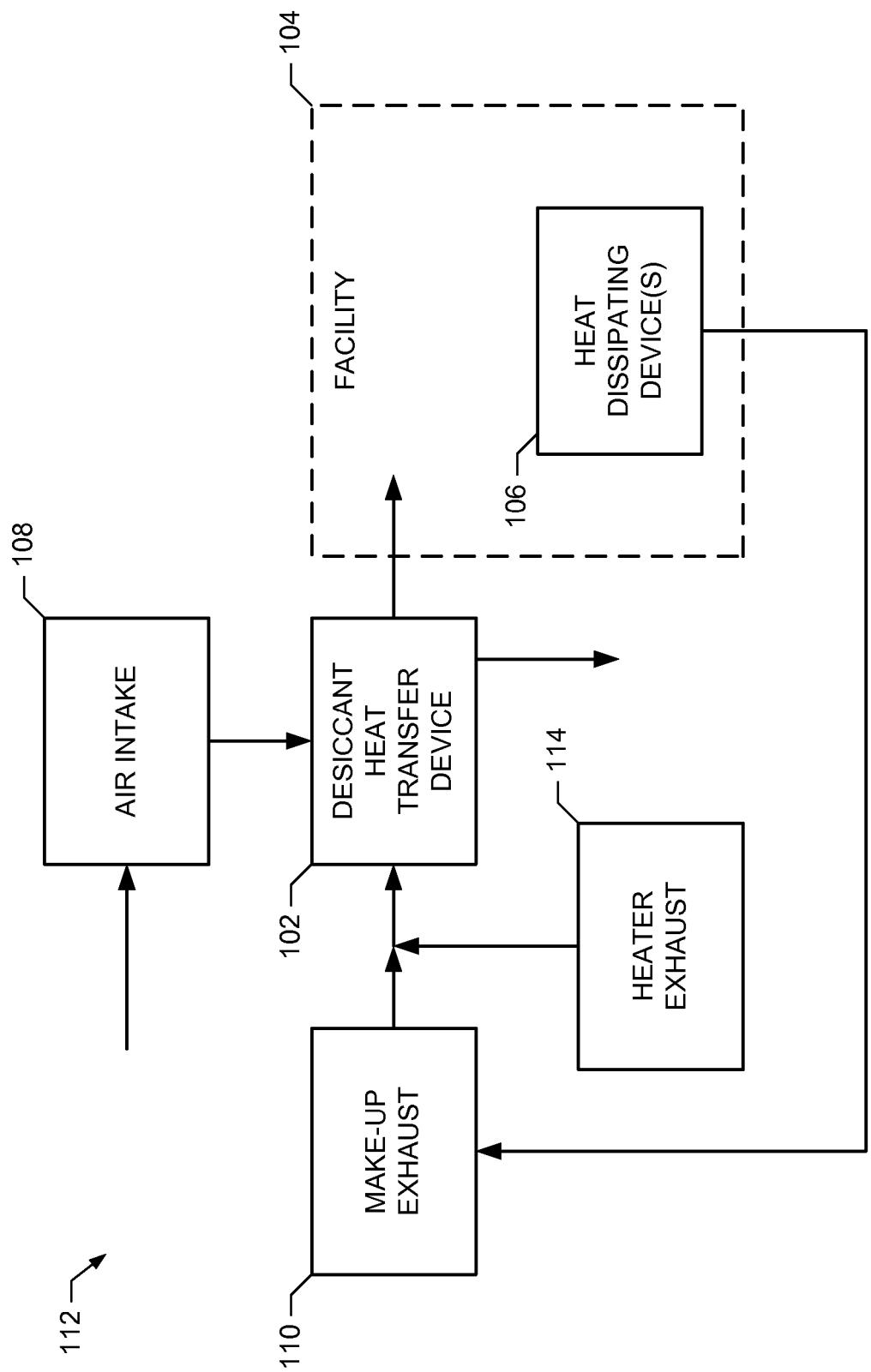
FIG. 1B is a block diagram of another example system constructed in accordance with the teachings of this disclosure to condition air.

FIG. 1B is a block diagram of another example system 112 to condition facility air. The example system 112 of FIG. 1B includes the example desiccant heat transfer device 102, the example facility 104, the example heat dissipating device(s) 106, the example air intake 108, and the example make-up exhaust 110 of FIG. 1A. In the example system 112 of FIG. 1B, the desiccant heat transfer device 102 conditions air and provides the conditioned air to the example facility 104 or another air conditioned space. The example heat dissipating device(s) 106 are located within the example facility 104. The heat dissipating device(s) 106 of FIG. 1B may be, for example, a colocation computing system.

The example system 112 of FIG. 1B further includes the air intake 108 to receive air to be conditioned (e.g., from an outside environment, the atmosphere, etc.). The air received by the example air intake 108 is conditioned by the desiccant heat transfer device 102, by a heat exchanger, by an evaporative cooler, by any other type of air conditioning device, and/or by any combination thereof.

The example system 112 of FIG. 1B further includes a heater exhaust 114 and the make-up exhaust 110. The example heater exhaust 114 receives hot exhaust air from, for example, a power generator, a reciprocating engine, or a microturbine. The make-up exhaust 110 receives exhaust air from the example heat dissipating device(s) 106. The example desiccant heat transfer device 102 receives combined air from the heater exhaust 114 and the make-up exhaust 110, which recharges the desiccant heat transfer device 102.

The example desiccant heat transfer device 102 of FIG. 1B receives a first airflow including air to be conditioned and a second airflow including air to recharge the desiccant heat transfer device 102. An air intake 108 receives the air to be conditioned by the desiccant heat transfer device 102 and delivers it to the device 102. In some examples, the air intake 108 receives air from an environment outside the facility 104. As air from the air intake 108 passes through the desiccant heat transfer device 102, the example desiccant heat transfer device 102 conditions (e.g., dries, cools) the air by adsorbing moisture from the air. The desiccant in the example desiccant heat transfer device 102 of FIG. 1B is alternated between an adsorbing stage (e.g., adsorbing vapor from air received via the air intake 108) and a recharging stage (e.g., releasing adsorbed moisture). The example desiccant heat transfer device 102 of FIG. 1B is a desiccant wheel and positions some desiccant material in the adsorbing stage and other desiccant material in the recharging stage at any given time. The desiccant heat transfer device 102 rotates (or otherwise changes position) to move the different portions of desiccant material between the different stages.

After the air from the air intake 108 is conditioned by the desiccant heat transfer device 102, the air is output to the facility 104. In some examples, the desiccant heat transfer device 102 dries and cools the air prior to outputting to the facility 104. Drying the air from the air intake 108 reduces the energy load used by the desiccant heat transfer device 102 to cool or otherwise condition the air to a desired temperature. Additionally, combining air output by the heat dissipating device(s) 106 with the air from the make-up exhaust 110 reduces the energy used to generate heated air with the heater exhaust 114 to recharge the desiccant heat transfer device 102, thereby enhancing the recharging efficiency. Recharging efficiency is enhanced because the air output by the heat dissipating device(s) 106 is pre-heated by the heat dissipating device(s) 106 and previously dried by the desiccant heat transfer device 102.

Figure 2:
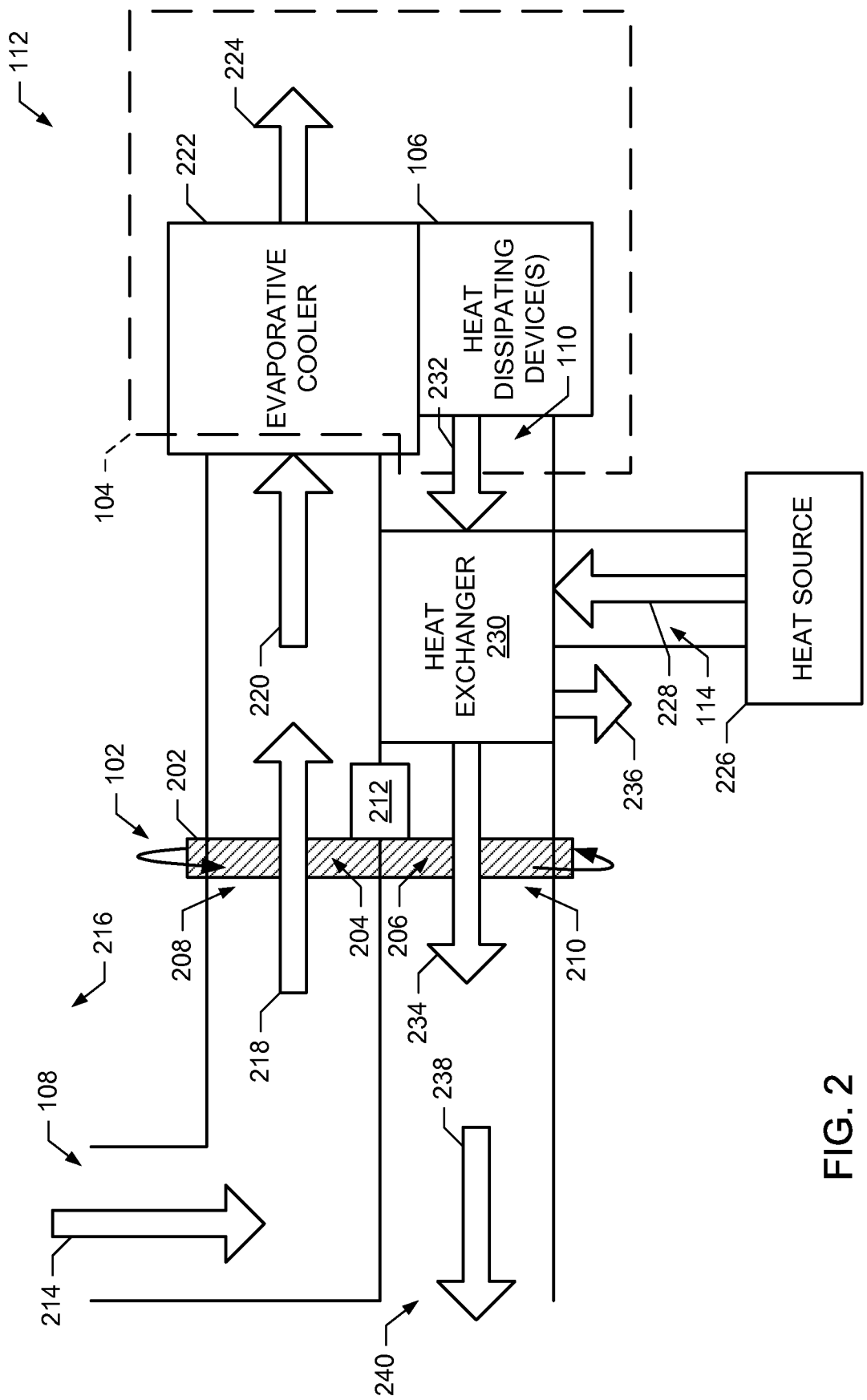
FIG. 2 is a schematic diagram of an example airflow through the system of FIG. 1B.

FIG. 2 is a schematic diagram illustrating example air flows through the system 112 of FIG. 1B. As described above, the example system 112 includes a desiccant heat transfer device 102 (e.g., a desiccant wheel), an air intake 108, a heater exhaust 114, and a make-up exhaust 110. The example system 112 is used with a heat dissipating device(s) 106 in an facility 104. The example system 112 of FIG. 2 may be used to prevent overheating and/or condensation of heat dissipating devices (e.g., computer systems) in a facility. In particular, the illustrated air flows serve to cool the facility 104 using less energy than known air conditioning systems for facilities.

The example desiccant heat transfer device 102 of FIG. 2 is implemented using a desiccant wheel 202. The example desiccant wheel 202 rotates in the illustrated direction to cause different sections 204, 206 of the desiccant wheel 202 to pass through an adsorption area 208 and a recharging area 210. The example desiccant heat transfer device 102 of FIG. 2 further includes a motor 212 or other mechanism to rotate the desiccant wheel 202 to cause the sections 204, 206 to alternate positions between the adsorption area 208 and the recharging area 210.

To provide conditioned air to the space 104, the example system 112 of FIG. 2 receives intake air 214 from an external environment 216 (e.g., the outside atmosphere) via the air intake 108. In some applications, the intake air 214 may be relatively warm (e.g., 25° Celsius (C.) or hotter) and/or humid (e.g., 9 grams/kilogram specific humidity or higher). Humid air, in particular, uses substantially more energy to cool using known cooling systems and increases the "carbon footprint" of data centers located in regions having humid climates. A carbon footprint provides a measurement of the resources required to build, maintain, and/or operate an object or system and is measured in standard units of carbon. While example environment conditions are given, the conditions are merely an illustration of an environment in which the example system 112 is useful. In general, the energy savings of the example systems 100 and 112 of FIGS. 1A, 1B, and/or 2 over known systems increases as the temperature and/or specific humidity rises.

When passing through the adsorption area 208 and the desiccant wheel 202, an intake airflow 218 loses a substantial portion of its moisture to the desiccant material and, thus, drops in both relative and specific humidity. The resulting dried air 220 has lower relative humidity than the intake air 214 entering the air intake 108 and, thus, uses less energy to cool effectively. The dried air 220 is input to an evaporative cooler 222, which further conditions (e.g., cools) the dried air 220 and outputs conditioned air 224 to the facility 104. Within the example facility 104, the conditioned air 224 cools the heat dissipating device(s) 106 to reduce the risk of overheating.

The desiccant material within the example desiccant wheel 202 has a finite capacity for adsorbing moisture and, once saturated, cannot adsorb further moisture until at least some of the stored moisture is released. To release moisture from the desiccant material, heat is applied to the desiccant material, which causes the desiccant material to desorb the moisture. Heating the desiccant material to release contained moisture is also referred to herein as "recharging" the desiccant material in the desiccant wheel 202 and/or a section 204, 206 of the desiccant wheel 202.

A heat source 226 provides a source of heat to recharge the desiccant wheel 202. The example heat source 226 of FIG. 2 is implemented using a power generation system that also provides power to, among other things, the example heat dissipating device(s) 106. Example power generation systems that may be used to implement the heat source include reciprocating engines, turbine engines, and/or any other type of power generation system that outputs heat in addition to power (e.g., electrical power).

The example heat source 226 of FIG. 2 provides heated air 228 to a heat exchanger 230 via the heater exhaust 114. The heat exchanger 230 transfers heat between the heated air 228 and make-up air 232 (e.g., computer exhaust air, exhaust air from machinery, etc.) from the make-up exhaust 110. The example make-up exhaust 110 receives the make-up air 232 from the heat dissipating device(s) 106 and provides the make-up air 232 to the heat exchanger 230. The heated air 228 of the illustrated example is substantially hotter than the make-up exhaust 110, and is also hotter than an upper temperature for recharging the desiccant material (e.g., 120-150° C., depending on the desiccant wheel 202).

To provide air at the appropriate recharging temperature for the desiccant wheel 202, the example heat exchanger 230 transfers heat from the heated air 228 to the make-up air 232 to raise the temperature of the make-up air 232 to the recommended recharging temperature (or within a range of temperatures) for the desiccant wheel 202. The example heat exchanger 230 regulates the flow of make-up air 232 and/or the flow of heated air 228 to control the temperature of recharge air 234 to a desired desiccant recharging temperature.

In some examples, the heated air 228 is contaminated (e.g., with exhaust fumes), while the make-up air 232 is substantially cleaner and/or drier. To avoid contamination and/or loss of adsorption capacity of the desiccant material in the desiccant wheel 202, the heat exchanger 230 of FIG. 2 transmits heat between the heated air 228 and the make-up air 232, but keeps the air 228 and 232 physically separated (e.g., does not mix the air 228 and 232). The example heat exchanger 230 outputs (cooled) exhaust air 236 to the external environment 216, to an exhaust scrubber, and/or to another exhaust management system. The heat exchanger 230 outputs the (heated) recharge air 234 to the recharging section 208 of the desiccant wheel 202 to recharge the desiccant material. In some examples, the heat exchanger 230 includes fan(s) or blower(s) to force the recharge air 234 and/or the exhaust air 236 to flow in the desired direction. In some other examples, the recharge air 234 and/or the exhaust air 236 are forced out of the heat exchanger 230 by air pressure resulting from upstream air flows (e.g., caused by exhaust fans in the heat dissipating device(s) 106 and/or the heat source 226) and/or temperature gradients.

The recharge air 234 is forced through the desiccant wheel 202. As a result, the desiccant material desorbs moisture into the recharge air 234. Accordingly, recharge output air 238 exits a recharge output port 240. The recharge output air 238 has higher moisture content than the recharge air 236. The example recharge output air 238 is also cooler than the recharge air 234 due to the heat exchange with the desiccant material and the acquisition of additional moisture.

Figure 3:
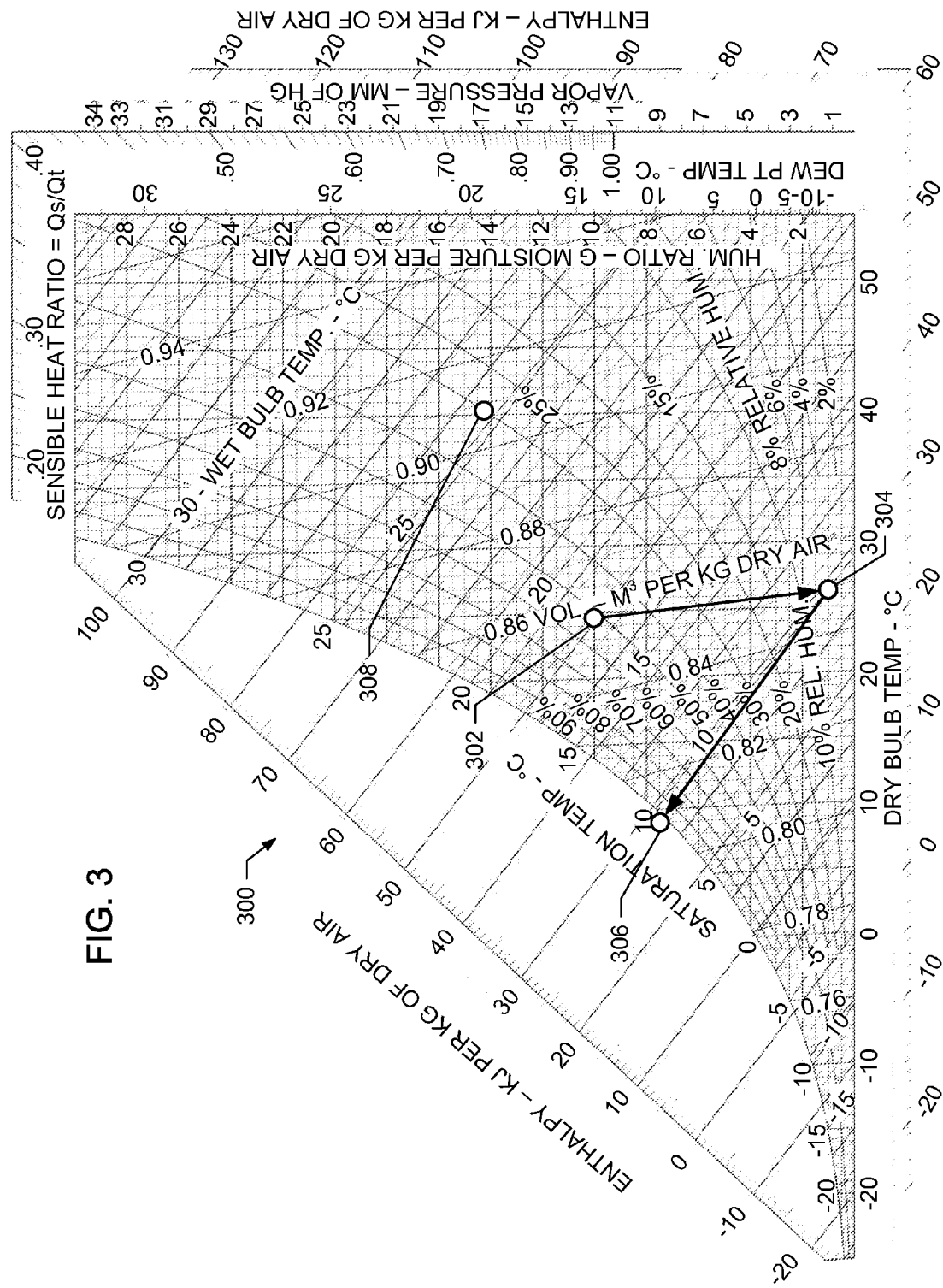
FIG. 3 is a psychrometric chart including example parameters of air used in the example airflow through the system of FIG. 1B.

FIG. 3 is a psychrometric chart 300 including characteristics of air used in the air flows through the example system 200 of FIG. 2. Psychrometric charts are used to determine physical and/or thermodynamic properties of gas/vapor mixtures. The example psychrometric chart 300 of FIG. 3 illustrates the changes in the properties of an airflow as it moves through the example system 112 of FIGS. 1B and 2.

The intake air 214 entering the example air intake 108 of FIG. 2 is represented by the point 302. As illustrated in FIG. 3, the intake air 214 has a relatively high temperature (e.g., about 25° C. dry-bulb temperature) and a relatively high humidity (e.g., about 9.43 g/kg specific humidity). The example point 304 represents the dried air 220 that has been dried by the desiccant wheel 202 and is supplied to the evaporative cooler 222 of FIG. 2. As illustrated in FIG. 3, the dried air 220 has increased slightly in dry-temperature (e.g., to about 26° C.), but has significantly decreased in moisture content (e.g., to about 0.85 g/kg specific humidity). The reduction in moisture content represented by the drop in specific humidity (without an attendant change in dry bulb temperature) is due to the adsorption of moisture from the intake air 214 by the example desiccant wheel 202.

The evaporative cooler 222 reduces the dry-bulb temperature of the dried air 220 and outputs the conditioned air 224. The conditioned air 224 is represented in FIG. 3 by an example point 306. The example transition from point 304 to point 306 reduces the dry-bulb temperature of the air to about 9° C. (e.g., via the evaporative cooler 222). Evaporative cooling increases the amount of moisture in the air to cool the air.

As illustrated in FIG. 3, a point 308 represents example characteristics of the recharge output air 238 of FIG. 2. The recharge output air 238 has a high dry-bulb temperature (e.g., about 40° C.) and a high dew point temperature (e.g., about 19° C.), which demonstrates a relatively high amount of moisture in the output air 238. A point cannot be plotted on the example psychrometric chart 300 of FIG. 3 for the recharge air 234 because the dry-bulb temperature of the example recharge air 234 (e.g., about 125-150° C.) extends substantially beyond the psychrometric chart 300 (which has an upper limit of 55° C. on illustrated dry-bulb scale).

Figures 4, 5:
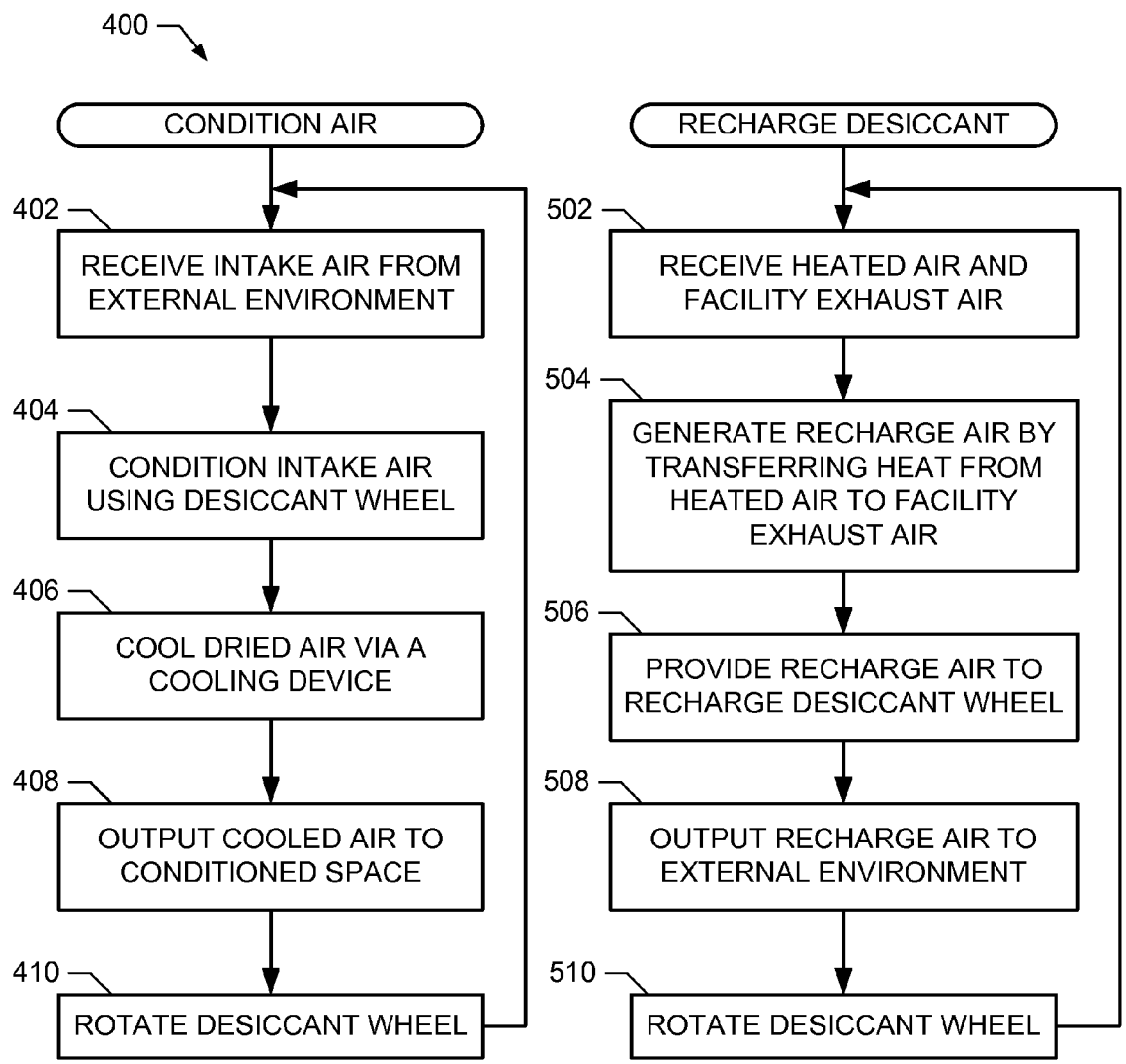
FIG. 4 is a flowchart representative of an example method to condition data center air.
FIG. 5 is a flowchart representative of an example method to recharge a desiccant heat transfer device.

FIG. 4 is a flowchart representative of an example method 400 to condition air. The example method 400 of FIG. 4 may be used to implement and/or operate the example systems 100 and 112 of FIGS. 1A, 1B, and/or 2.

To condition air for a facility (e.g., the facility 104, a data center, etc.), the example air intake 108 receives intake air 214 from an external environment (e.g., the external environment 216) (block 402). The example desiccant wheel 202 conditions (e.g., dries) the intake air 214 (block 404). For example, the desiccant material in the desiccant wheel 202 adsorbs moisture from the intake air 214. The example evaporative cooler 222 cools the dried air 220 from the desiccant wheel 202 (block 406) and outputs the cooled air 224 to the facility 104 of FIG. 2 (block 408). The cooled air 224 conditions the facility 104 and/or reduces the risk of overheating the heat dissipating device(s) 106. The example blocks 402-408 are discussed with respect to a given volume of air. The example motor 212 rotates the desiccant wheel 202 (block 410).

The example method 400 iterates to continue conditioning air for the example facility 104. In some examples, the motor 212 rotates the desiccant wheel 202 for the duration of the example method 400. The method 400 is an example conditioning process for a given volume of air entering the example air intake 108 of FIGS. 1A, 1B, and/or 2 and, thus, the example systems 100 and 112 of FIGS. 1A, 1B, and/or 2 may perform combinations of the blocks 402-410 simultaneously on different volumes of air (e.g., the example system 112 simultaneously conditions a first volume of air at block 404 while cooling a second volume of air at block 406).

FIG. 5 is an example method 500 to recharge a desiccant heat transfer device. The illustrated example method 500 may be used to recharge the desiccant heat transfer device 102 of FIG. 1B and/or the desiccant wheel 202 of FIG. 2. In some examples, the method 500 is performed continuously and/or simultaneously with the example method 400 of FIG. 4. For example, the example method 400 is used to condition air travelling through the adsorption area 208 of FIG. 2 while the example method 500 is used to recharge the example desiccant wheel 202 in the recharge area 210.

To recharge an example desiccant heat transfer device 102 (e.g., the desiccant wheel 202 of FIG. 2), the heat exchanger 230 receives heated air 228 (e.g., from a heat source 226) and facility exhaust air 232 (e.g., from the heat dissipating device(s) 106) (block 502). The example heat exchanger 230 generates recharge air 234 by transferring heat from the heated air 228 to the exhaust air 232 (block 504). The heat exchanger 232 provides the recharge air 234 to recharge the desiccant wheel 202 (block 506). The example recharge air 234 causes the desiccant to desorb moisture into the recharge air 234. The recharge output port 240 outputs the recharge air 234 to the external environment 216 (block 508). The example motor 212 rotates the desiccant wheel 202 (block 510). In some examples, the motor 212 rotates the desiccant wheel 202 for the duration of the example method 500. The example method 500 iterates to continue recharging the desiccant material in the desiccant wheel 202.

The example method 500 iterates to continue recharging the example desiccant wheel 202 of FIG. 2. In some examples, the motor 212 rotates the desiccant wheel 202 for the duration of the example method 500. In other examples, the wheel 202 is intermittently rotated and stopped. The example systems 100 and 112 of FIGS. 1A, 1B, and/or 2 may perform combinations of the blocks 502-510 simultaneously and/or continuously for different volumes of air (e.g., the example system 112 simultaneously generates a first volume of recharge air at block 504 while outputting a second volume of recharge air at block 508).

Figure 6:
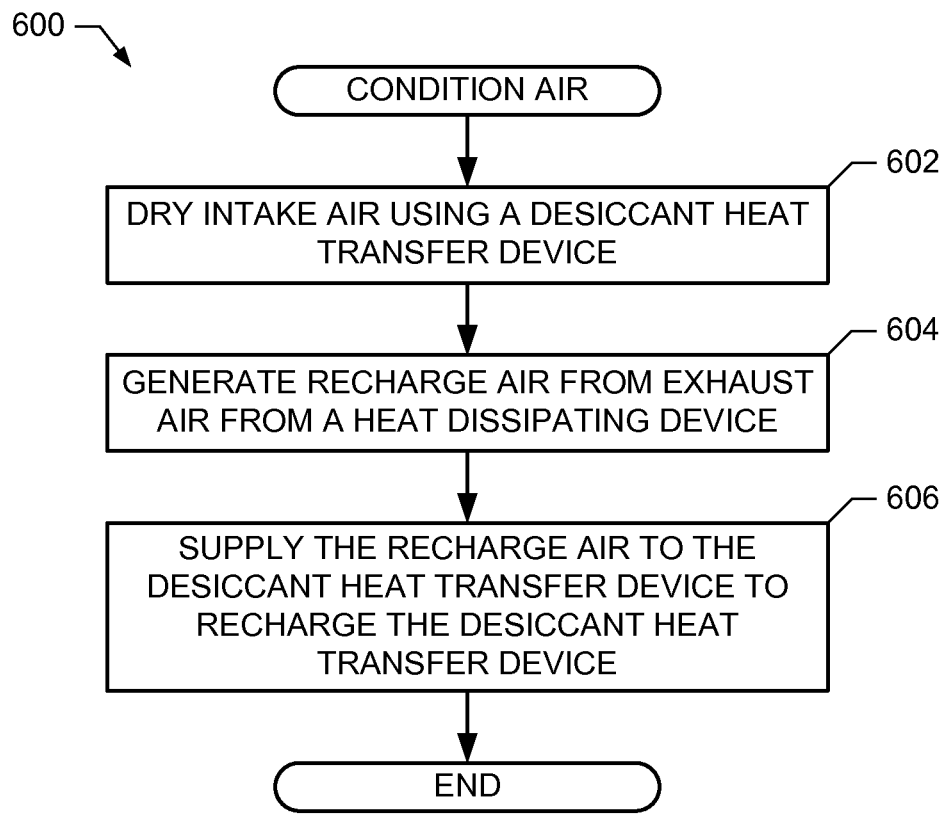
FIG. 6 is a flowchart representative of an example method to condition air.

FIG. 6 is a flowchart representative of an example method 600 to condition air. The illustrated example method 600 may be used to condition air using the desiccant heat transfer device 102 of FIGS. 1A and 1B, and/or the desiccant wheel 202 of FIG. 2.

The example method 600 begins by drying intake air using a desiccant heat transfer device (e.g., the desiccant heat transfer device 102 of FIGS. 1A and 1B, the desiccant wheel 202 of FIG. 2) (block 602). The example desiccant heat transfer device 102 receives the intake air from the air intake 108. The method 600 generates recharge air from exhaust air, where the exhaust air is from heat dissipating device(s) (block 604). For example, the heat dissipating device(s) 106 of FIGS. 1A, 1B, and 2 generate exhaust air. As illustrated in FIGS. 1A, 1B, and 2, the exhaust air is combined with air from the heater exhaust 114 to generate recharge air.

The example method then supplies the recharge air to the desiccant heat transfer device 102 to recharge the desiccant heat transfer device 102 (block 606). The recharge air causes a desiccant material in the desiccant heat transfer device 102 to desorb moisture, which recharges the desiccant material. Recharging the desiccant material frees at least a portion of the capacity of the desiccant material to adsorb moisture, and enables the desiccant heat transfer device 102 to adsorb further moisture. The example method 600 may then end and/or iterate to continue conditioning air.

From the foregoing, it will be appreciated that the example systems and methods condition air (e.g., air for a facility such as a data center) using fewer resources than known air conditioning systems. The decrease in resource consumption is particularly significant in hot, humid climates.

Although certain methods, apparatus, and articles of manufacture have been described herein, the scope of coverage of this patent is not limited thereto. To the contrary, this patent covers all methods, apparatus, and articles of manufacture falling within the scope of the claims.

What is claimed is:

1. A system to condition air, comprising:
   a desiccant heat transfer device to supply conditioned air to a facility;
   an air intake to receive air to be conditioned via the desiccant heat transfer device;
   a make-up exhaust to provide exhaust air from a heat dissipating device in the facility to provide heated air to reactivate the desiccant heat transfer device; and
   a heat exchanger to transfer heat between the heated air and the exhaust air and to provide heated exhaust air to recharge the desiccant heat transfer device.

2. The system of claim 1, wherein the air intake is to receive air from an environment external to the facility center.

3. The system of claim 1, wherein the desiccant heat transfer device is to adsorb moisture from the received air.

4. The system of claim 1, wherein the desiccant heat transfer device comprises a desiccant wheel and a motor to rotate the desiccant wheel.

5. The system of claim 1, further comprising a cooling device to cool the conditioned air from the desiccant heat transfer device.

6. The system of claim 1, wherein a reactivation temperature of the heated exhaust air is sufficient to cause a desiccant material in the desiccant heat transfer device to desorb moisture into the heated exhaust air.

7. The system of claim 1, wherein the heat exchanger is to keep the heated air and the exhaust air physically separated.

8. The system of claim 1, further comprising a heater exhaust to provide the heated air from a heat source.

9. The system of claim 1, wherein the heat exchanger is to combine the heated air and the exhaust air.

10. A method to condition air, comprising:
    drying intake air using a desiccant heat transfer device;
    generating recharge air from exhaust air from a heat dissipating device by transferring heat between heated air and the exhaust air via a heat exchanger; and
    supplying the recharge air to the desiccant heat transfer device to recharge the desiccant heat transfer device.

11. The method of claim 10, wherein generating the recharge air comprises transferring heat from the heated air to the exhaust air.

12. The method of claim 11, further comprising keeping the heated air and the exhaust air physically separated.

13. The method of claim 10, wherein generating the recharge air comprises combining the exhaust air with the heated air.

14. The method of claim 13, wherein the heated air comprises exhaust air from a power generation device.

15. The method of claim 10, wherein the exhaust air comprises exhaust air from a plurality of computer systems in a data center.

16. The method of claim 10, further comprising rotating the desiccant heat transfer device to move a first section of the desiccant heat transfer device from an adsorption stage to a recharging stage and to move a second section of the desiccant heat transfer device from the recharging stage to the adsorption stage.

17. The method of claim 10, further comprising cooling the intake air after drying the intake air.

18. The method of claim 10, further comprising outputting the dried air to a facility containing the heat dissipating device.

19. The method of claim 18, further comprising receiving air from an environment outside the space.

\* \* \* \* \*